United States Patent [19]
Lamprecht

[11] 3,860,863
[45] Jan. 14, 1975

[54] APPARATUS FOR CONVERTING LIGHT ENERGY INTO ELECTRICAL ENERGY

[75] Inventor: Adolf Lamprecht, Hausen, Germany

[73] Assignee: Rowenta-Werke GmbH, Offenbach, Germany

[22] Filed: Oct. 12, 1973

[21] Appl. No.: 406,032

[30] Foreign Application Priority Data
Oct. 28, 1972 Germany.......................... 2253039

[52] U.S. Cl..................... 321/2, 250/212, 307/311, 321/16, 331/66
[51] Int. Cl. ........................................... H02p 13/18
[58] Field of Search ................. 321/2, 16; 136/206; 250/212; 331/47, 55, 66, 112, 185, 186; 320/61; 307/311

[56] References Cited
UNITED STATES PATENTS

| | | |
|---|---|---|
| 2,894,173 | 7/1959 | Paradise................................ 331/66 |
| 3,064,177 | 11/1962 | Bender................................... 321/2 |
| 3,222,535 | 12/1965 | Engelhardt.......................... 250/212 |
| 3,302,130 | 1/1967 | Minks................................... 321/2 |
| 3,313,939 | 4/1967 | Spencer.............................. 307/311 |
| 3,464,773 | 9/1969 | Waz..................................... 307/311 |

*Primary Examiner*—William H. Beha, Jr.
*Attorney, Agent, or Firm*—George R. Clark; Neil M. Rose; John S. Pacocha

[57] ABSTRACT

Apparatus for converting light energy into electrical energy including photoelectric cells connected across a storage device providing a direct voltage input to a d.c. transformer, which converts its direct voltage input into a higher voltage alternating or intermittent output and comprising an oscillator or switching circuit having a photosensitive device connected in its timing circuit so that the frequency of oscillation or switching varies with the illumination level of the photoelectric cells.

15 Claims, 7 Drawing Figures

APPARATUS FOR CONVERTING LIGHT ENERGY INTO ELECTRICAL ENERGY

This invention concerns improvements in or relating to apparatus for converting light energy into electrical energy utilizing photoelectric transducers.

The conversion of light energy into electrical energy by means of photoelectric transducers is well known. A known silicon photoelectric cell, for example with an area of 20 mm × 20 mm, on irridation with direct sunlight is capable of providing a voltage of about 400 mV at a power level of almost 40 mW. Although this output power is adequate for some cases, for most applications higher voltages are required and can be obtained simply by series-connecting several photo-electric cells. However, whilst this approach is practicable for example where the addition cost is not regarded as significant and there is space for such photo-electric cells, in other circumstances where a limited energy output is acceptable and where the amount of space available is not great and the additional cost is regarded as significant, methods other than merely increasing the number of photo-electric cells must be sought.

In one known arrangement two series-connected photo-electric cells, each with an area of 4 $cm_2$, are connected to a direct current transformer in the form of a push-pull sine-wave oscillator.

At a low input voltage of 0.8v the transformer has a relatively good efficiency of about 0.6 and, with a load resistance of 5k, can provide a terminal voltage of approximately 13v (Telefunken-Laborbuch V, Pages 340, 341).

Devices for converting light energy into electrical energy generally are designed for optimum efficiency in full solar radiation which is really only obtainable in out-space. Thus known devices are disadvantageous in that they can operate with optimum efficiency only under the conditions occurring in outer-space. In the light or illumination conditions usually occurring on earth, and in the conditions in a room where the illumination is nowhere near that which occurs in outer-space, such known devices operate with reduced efficiency and at varying levels of efficiency dependent upon the illumination intensity. The presence of mist and clouds can reduce the available radiation to a fraction of the illumination occurring in outer-space and, furthermore, illumination levels change rapidly on earth. Thus, for example, if under direct solar-radiation an illumination of 60,000 Lux is measured then, in a normally lighted room, at the window the illumination typically may be about 6,000 Lux and towards the ceiling only of the order of 3,000 Lux. If clouds cover the sun, the illumination in the room can fall abruptly to values between 200 and 600 Lux.

Under such conditions, known devices are not in practice operable at constant optimum efficiency. With relatively low illumination, the efficiency drops to low values which are not suitable for energy conversion. In addition, for most applications a sine wave output voltage is not required and the expenditure involved in obtaining a sine wave is unnecessary. Thus the known device would not be suitable for providing the electricity supply of small electrically powered devices such as, in particular, household devices.

Another known arrangement (see "The use of photoelectric semi-conductors, Part II, Siemens, Techn, Mitteilungen, Best. -Nr. 2-6300-138") is adapted for the direct utilisation of solar radiation for charging the buffer store of a measuring device and is constructed in such a way as to be operable despite periods of unfavourable illumination. The buffer store accumulators are first charged and they in turn supply electrical power to measuring devices or clocks or supply electric current to initiate chemical or mechanical processes. This known arrangement includes a blocking oscillator/transformer connected between e.g., eight series-connected solar cells and a 6V storage battery of approximately 250 mAh capacity and arranged to permit a certain degree of charging even under low irradiation. The arrangement is required to supply to a load about 1 mW throughout 24 hours operation, i.e., about 24 mWh. Since the efficiency of the blocking oscillator/transformer is about 0.5 and the discharge: charge efficiency is about 0.7, therefore about 70 mWh daily must be supplied. In northern latitudes in winter, irradiation can be expected for only 6 to 8 hours, so that during this time an average charging capacity of 12–18 mW is necessary. However, even in these 6 hours the irradiation can be so non-uniform as a result of the weather that full solar radiation may only occur for a fifth of the time. Also account must be taken of the angle of incidence of the solar radiation where no tracking or mirror system is provided to maintain the solar cells in an orientation for optimum illumination. In the known arrangement these external influences are counteracted in that a peak requirement of at least 50 mW and preferably 100mW is fixed. As a result the apparatus must be equipped with from 6 to 10 photoelectric cells.

In one example of the above-mentioned known arrangement, eight series-connected photoelectric cells power a blocking oscillator/transformer to the output of which is connected a 6V storage cell and a load. The blocking oscillator/transformer oscillates at a terminal voltage between 0.8 and 1v so that even at low illumination charging of the storage cell commences. In addition, the blocking oscillator/transformer is designed in such a way that its input resistance is about 100 ohm in the low illumination range. The internal resistance of the photoelectric cell unit is of the same order of magnitude so that favourable matching is obtained. With increasing irradiation and increasing voltage both resistances are smaller so that favourable matching is obtained over a larger radiation range.

The blocking oscillator/transformer comprises a switching transistor having a primary winding in its emitter/collector circuit and a feedback winding in its base circuit which also incorporates an RC network. The frequency of operation of the blocking oscillator/transformer is determined by the inductance of the primary winding and the feedback winding, by the transistor data, and by the time constant of the RC network connected to the base of the switching transistor. The frequency of the blocking oscillator/transformer clearly varies with the applied voltage delivered by the photoelectric cells; under average irradiation, the frequency is about 10 kHz.

In order to be capable of operation under varied illumination conditions, the above-mentioned arrangement requires a very large number of photoelectric cells which for space reasons and owing to the high costs involved, cannot always be provided. If, for example, the number of photoelectric cells is reduced to four, then this circuit has a feature which restricts its use in conjunction with devices which must be able to operate with continually changing illumination as well as under the conditions in a room. Up to an illumination between 1,000 and 3,000 Lux the power available rises almost proportionally with the illumination, but then there is a power bend. Despite increasing illumination, the power supplied declines finally sinking to a relative low where it remains uninfluenced by further increasing illumination.

For the above reasons, this known arrangement cannot be used for the power supply of relatively small devices whose area does not for example provide adequate space for 8 to 10 photoelectric cells. This problem cannot simply be overcome for example by arranging half the photoelectric cells on one, the illuminated, side of the casing of the device and placing the other photoelectric cells on the opposite, not illuminated, side since the not-illuminated photoelectric cells would, relative to the illuminated photoelectric cells constitute considerable loss resistances which would additionally prevent optimum energy utilisation particularly at low illumination.

In the case of power supply circuits employing conversion of light energy into electrical energy under continually varying illumination conditions, particularly under the usual lighting conditions of closed rooms, tests have shown that it is fundamentally a question of the apparatus, on the one hand, functioning with high efficiency at low illumination and, on the other being able rapdily and with high efficiency to top up an electrical energy store during the more or less numerous phases with good illumination.

The object of the present invention is to provide an apparatus for the conversion of light energy into electrical energy which is particularly adapted for optimum energy output under varying illumination conditions, particularly those encountered in rooms. The apparatus should desirably incorporate only a minimum nuber of photoelectric cells and other switching elements and desirably should be inexpensive and space-saving so as to be incorporable in particularly small devices.

We have found that this object can be achieved simply by employing a direct current transformer connected to the power supplying photoelectric cells and incorporating in the circuit of the direct current transformer a photo sensitive device (e.g., a photoconductive or photo-voltaic device) arranged to adjust the frequency of operation of the direct current converter in accordance with the intensity of the incident illumination.

According to the present invention therefore there is provided an apparatus for the conversion of light energy into electrical energy including a photoelectric transducer capable of generating electrical energy when exposed to visible or other light radiation, an electrical storage device connected to said photoelectric transducer for storing energy generated thereby, a direct current transformer connected to receive electrical energy derived from said photoelectric transducer and stored in said electrical storage device, said direct current transformer being adapted to convert the direct voltage output of said photoelectric transducer into an alternating or intermittent voltage, and a photosensitive device in circuit with said direct current transformer so as, in operation, to control the frequency of said alternating or intermittent voltage in dependence upon the level of illumination of said photoelectric transducer.

The electrical storage device can most conveniently be constituted by a capacitor connected in parallel with the photoelectric transducer and the description hereinafter will relate only to such an arrangement although it will be appreciated that other arrangements are possible within the scope of this invention, e.g., the storage device could comprise a series-connected inductor.

The output of the d.c., transformer, i.e., an alternating or intermittent voltage the frequency of which is dependent upon the level of illumination of the apparatus, preferably is fed via a rectifier to charge a storage capacitor or an accumulator cell from which a device such as an electric clock or electrically operated table lighter for example can be powered.

The means for converting the direct voltage output of the photoelectric transducer into an alternating or intermittent voltage may simply take the form of a transistor oscillator or switching circuit, in which case the said photosensitive device conveniently may be connected in a timing circuit, e.g., an RC circuit, serving to determine the frequency of oscillation or switching. Thus, for example, in one arrangement according to the invention the photosensitive device is a photoresistor which serves to determine the charging rate of a capacitor the potential across which constitutes a trigger voltage for a transistor switching circuit. Alternatively, in another embodiment, a transistor oscillator incorporating a feedback winding inductively coupled with said primary winding is employed for converting the direct voltage from the photoelectric transducer into an alternating voltage and a photoresistor constituting said photosensitive device is connected in an RC circuit coupled to said feedback winding and serving to determine the frequency of oscillation.

While the photosensitive device can, as in the above-mentioned exemplary embodiments of this invention, comprise a photoresistor or like photoconductive device, it may be comprised by a photoelectric cell (advantageously of the same spectral sensitivity as the said photoelectric transducer) in which case it may for example serve to determine the state of conduction of a control transistor connected in the timing circuit of a transistor oscillator or switching circuit.

It is convenient to employ a photoresistor as the photosensitive device since this minimises the number of components required. Photoresistors can be used which exhibit high conductance wtih high illumination and low conductance with low illumination. However photoresistive circuits are also conceivable wherein there is a reverse dependence between illumination and conductance in which case the circuit must be adapted to such characteristics. Clearly it is preferable to select a photoconductive device having a similar spectral sensititivity characteristic to that of the photoelectric cells constituting the photoelectric transducer. Furthermore, it is desirable to arrange that the variable conductivity characteristics of the photoconductive device are appropriate to the characteristics of the d.c. transformer in whose circuit it is connected, and it may be desirable in some cases to place a gray or neutral density filter across the photoconductive device to achieve this. Rather than using a gray filter, the photoconductive resistor can be constituted by a combination of a photoconductive resistor and a trimming resistor which can readily be adjusted in value to match other components of the apparatus. Since the load current of the apparatus according to the invention does not flow through the controlling photo sensitive device, only limited losses occur in the controlling photosensitive device which is advantageous particularly in conditions of low illumination where the power from the photoelectric transducer is low. As will become clear hereinafter, the controlling of the d.c. transformer frequency in dependence upon the level of illumination makes it possible for the photoelectric cells of the photoelectric transducer to operate for maximum power output under the prevailing illumination, be it high or low, by arranging that, irrespective of the level of illumination, the photoelectric cells operate at the optimum power point in their current-voltage characteristic. The frequency of the d.c. transformer is controlled in such a way that, at all illuminations, only as much energy is taken from the electrical storage device coupled to the photoelectric transducer as the photoelectric transducer can deliver under the prevailing illumination; thus, energy is extracted from the storage device at a rate proportionate to the rate at which energy is supplied to the storage device by the photoelectric transducer. As a result of this matching, the apparatus according to the invention, under strong illumination, is able to utilise the favourable conditions and rapidly charge the energy store; in this way, an optimum light-to-energy yield is obtained. The invention achieves the result that the power drain on the photoelectric transducer varies with its illumination; with strong illumination, a high power output can be met by the photoelectric transducer, whereas with low illumination only that amount of energy is taken from the photoelectric transducer storage device as can be subsequently delivered. In this way not only is the efficiency increased relative to comparable devices, but also the efficiency curve is flattened so that the efficiency during periods of poor illumination is as good as with optimum and very good illumination.

Since presently available photoelectric cells have only a relatively low intrinsic efficiency, the present invention considerably improves their energy yield. This is of particular importance where only a limited number of photoelectric cells or electrical switching elements can be used in a small space. The apparatus according to the invention is particularly suitable for supplying power to lighters, clocks, radios, flashlight equipment, and measuring devices etc. particularly household equipment.

Clearly, the photosensitive device, generally a photoconductive resistor, must be located to be subject to illumination in the same field of illumination as the photoelectric transducer producing the power.

In order that the invention might be more clearly understood a number of exemplary embodiments thereof will now be described in detail with reference to the accompanying drawings wherein.

Figure 1:
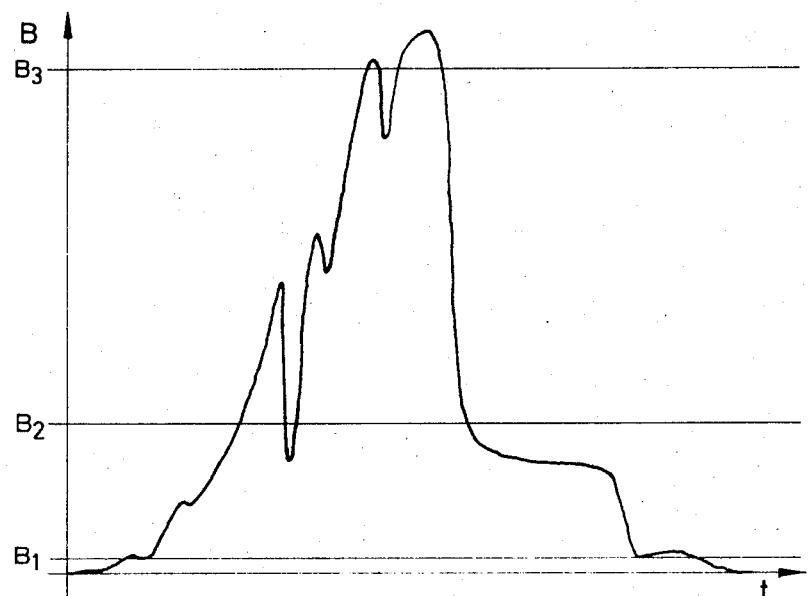
FIG. 1 shows a typical illumination curve for one day.

Referring first to FIG. 1 there is shown therein a typical graph showing illumination relative to time. As opposed to constant illumination, for example as in outerspace, the illumination in a room or on the outer wall of a house depends largely on the time of day and also on the varying cloud cover.

The illumination pattern according to FIG. 1 shows that the light radiation can rise suddenly to relatively high values, e.g., as at B 3, but can also drop suddenly to relatively low illuminations. With known circuits which are designed for a constant maximum illumination under the conditions represented in FIG. 1, the optimum efficiency cannot be achieved for all levels of illumination. For operation under terrestrial conditions, a circuit is required which provides good efficiency over a substantial range of illumination levels.

Figure 2:
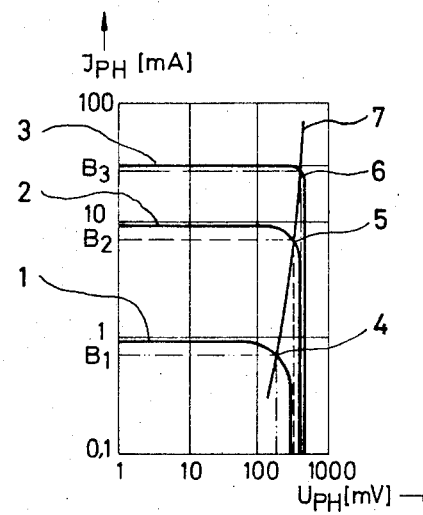
FIG. 2 shows typical current-voltage characteristics of a photoelectric cell with incident illumination as a parameter.

FIG. 2 shows typical characteristics for a presently obtainable photoelectric cell under illumination levels B 1, B2 and B3 as shown in FIG. 1. In the double logarithmic scale of FIG. 2 the individual characteristic curves have sharp bends. In curve 1 the bend occurs at point 4, in curve 2 at point 5, and in curve 3 at point 6. Below curve 1 is a rectangle bounded by a line consisting of dashes and two dots. The area of this rectangle represents the maximum power which can be produced at the illumination level represented by B1.

A corresponding rectangle below curve 2 is represented by a dashed line, whereas the reactangle under curve 3 is represented by a dot-dash line. The locus 7 of the optimum working points 4, 5 and 6 constitutes the characteristic curve for determining the optimum functioning of an apparatus for converting light energy into electrical energy under varying conditions of illumination B. To operate on this locus, the apparatus for converting light energy into electrical energy must be so designed that it always provides a voltage Uph on the photoelectric cells necessary for their operation at their optimum working points on the locus 7.

Figure 3:
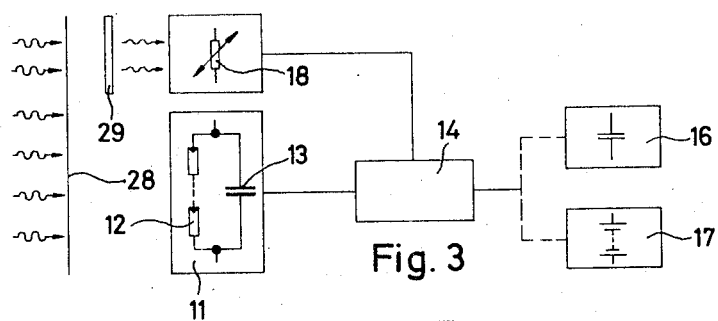
FIG. 3 shows a block diagram of an apparatus according to the invention.

FIG. 3 shows the block diagram of a light energy into electrical energy conversion apparatus according to the invention. A photoelectric supply unit 11 contains photoelectric cells 12 coupled with an electrical storage device, here constituted by a parallel-connected capacitor 13 although it could be for example a series-connected inductor.

The photoelectric power supply unit 11 is connected to a direct current transformer 14 the frequency of operation of which is, in accordance with the invention, controlled by a resistor 18 whose electrical conductance varies with the incident illumination. As can be gathered from FIG. 3, the photoelectric cells 12 and the photoconductive resistor 18 are arranged in the same field of illumination 28. It is important that all the photoelectric cells 12 are arranged within this field of illumination 28 since if only certain photoelectric cells were subject to the full illumination and others were subject only to a lesser illumination, then these others would represent a load impedance to the fully illuminated photoelectric cells.

A gray or neutral density filter 29 can if desired be placed in front of the photoconductive resistor 18 for the purpose of adapting the photoconductive characteristics of resistor 18 more closely to the characteristics of the d.c. transformer 14.

Desired loads 16 or 17 can be connected to the direct current transformer 14. Load 16 represents a capacitor, whereas load 17 represents accumulators which serve as energy stores.

Figure 4:
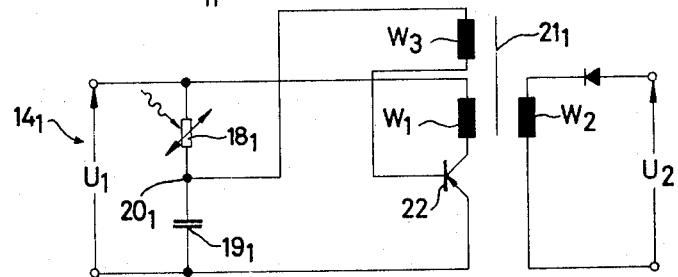
FIGS. 4 to 7 show circuit diagrams representing various forms of light-controlled d.c. transformers suitable for use in an apparatus as shown in block diagrammatic form in FIG. 3.

The frequency of operation of the transformer 14 is controlled by the resistor 18 in dependence upon the level of illumination thereof. Transformer circuits, for example such as are shown in FIGS. 4 and 6, are possible wherein the frequency rises with decreasing illumination and falls with increasing illumination. The objects of the invention can also be achieved with transformer circuits, such as for example that according to FIG. 5 whose frequency rises with rising illumination and falls with falling illumination. In both cases, the transformer circuit operates to ensure that only that amount of energy is taken from capacitor 13 which can subsequently be delivered by the photoelectric cells 12 under the prevailing illumination. With low illumination, the energy portions taken from the capacitor are small, whereas with higher illumination larger energy portions are removed. As a result, the operating voltages of the photoelectric cells 12 are always kept at their optimum working points on the locus 7 according to FIG. 2. The photoelectric cells 12 thereby supply to capacitor 13 the maximum amount electrical energy commensurate with the level of incident illumination.

FIG. 4 shows the detailed circuit diagram of a first form of light-controlled d.c. transformer suitable for incorporation into the apparatus of FIG. 3. The direct current transformer $14_1$ is connected to receive voltage $U_1$ from the photoelectric power supply unit 11. The d.c. transformer includes transformer $21_1$ having a primary winding $W_1$ inductively coupled with a feed back winding $W_3$ and a secondary winding $W_2$. A diode is provided in circuit with the secondary winding $W_2$. The output voltage of the d.c. transformer is indicated at $U_2$.

The d.c. transformer of FIG. 4 further includes a switching transistor 22 having its base connected, via the feed back winding $W_3$, to the connecting point $20_1$ of an RC system comprising a photoconductive resistor $18_1$ and a capacitor $19_1$. The resistor $18_1$, whose electrical conductance is dependent on the incident illumination serves to determine the operating point of switching transistor 22. Voltage surges induced in feedback winding $W_3$ reach the base-emitter path of transistor 22 by way of capacitor 19. As will be well appreciated by those skilled in the electronic art, the frequency of operation of direct current transformer $14_1$ is determined by the inductance of winding $W_1$ of transformer $21_1$, by the turns ratio of winding $W_1$ to winding $W_3$, and by the particular values of the RC system comprising resistor $18_1$ and capacitor $19_1$. With correct dimensioning, the resistor $18_1$ adapts the frequency of transformer $14_1$ to the illumination conditions in such a way that with weak illumination the d.c. transformer operates at a high frequency and with strong illumination the d.c. transformer operates at a low frequency.

Figure 5:
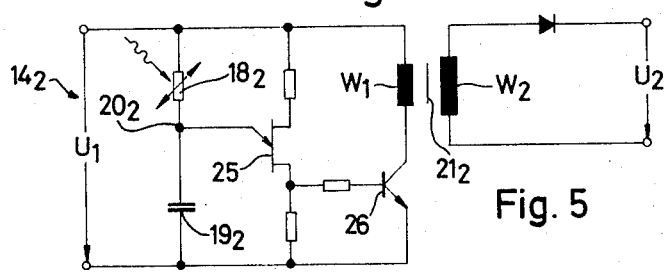
Figure 6:
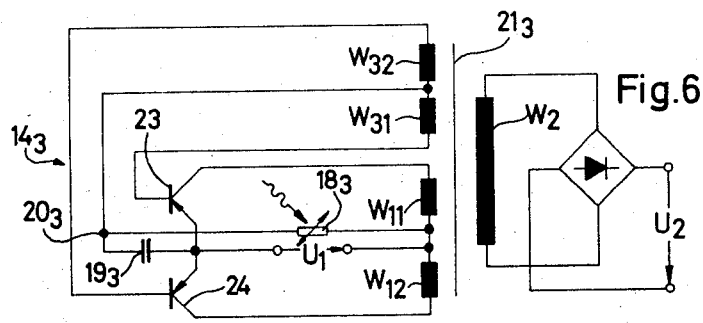

FIG. 5 shows an alternative arrangement of that of FIG. 4 wherein the direct current transformer $14_2$ includes a transformer $21_2$ which has a primary winding $W_1$ and a secondary winding $W_2$ which, via a diode, generates an output voltage $U_2$. The primary winding $W_1$ is connected in the collector circuit of a switching transistor 26 controlled by a uni-junction transistor 25. The emitter of uni-junction transistor 25 is connected to connection point $20_2$ of an RC system which comprises a resistor $18_2$, the conductance of which is dependent on the illumination, and a capacitor $19_2$. As with the preceding Figure, the direct current transformer $14_2$ is again connected to receive the output voltage $U_1$ of the photoelectric power supply unit 11.

As soon as capacitor $19_2$ charges via resistor $18_2$ to the trigger voltage of the uni-junction transistor 25, switching transistor 26 is rendered conductive by uni-junction transistor 25, and current flows through the primary winding $W_1$ of transformer $21_2$. Capacitor $19_2$ then discharges through the emitter-base path of uni-junction transistor 25 until uni-junction transistor 25 again switches off thereby causing switching transistor 26 to become non-conductive. The cycle begins again when capacitor $19_2$ again charges to the trigger voltage of the uni-junction transistor 25. The charging time of capacitor $19_2$ and thus the frequency of the d.c. transformer is determined by resistor $18_2$ and thus is dependent upon the level of incident illumination.

A further arrangement shown in FIG. 6 comprises a direct current transformer $14_3$ constructed to operate in a push-pull fashion. The transformer $14_3$ includes a transformer $21_3$, the primary windings $W_{11}$ and $W_{12}$ of which operate in a push-pull manner on a secondary winding $W_2$ which, via a bridge rectifier, generates an output voltage $U_2$. Transformer $21_3$ has two feed back windings $W_{31}$ and $W_{32}$ which operate on the bases of switching transistors 23 and 24. The connection point $20_3$ of an RC system, comprising a resistor $18_3$ the conductance of which is dependent on the illumination and a capacitor $19_3$, is connected to the centre tap of the feed back windings $W_{31}$ and $W_{32}$. It will be seen that in the arrangement of FIG. 6 each of the transistors 23 and 24 with its associated primary and feedback windings $W_{11}$ and $W_{31}$, and $W_{112}$ and $W_{32}$ respectively, operates in a manner similar to the operation of transistor 22 of the FIG. 4 arrangement, the two transistors 23 and 24 being rendered conductive and non-conductive alternately. It will be noticed that the unidirectional rectifier diode in the FIG. 4 arrangement is replaced by a bridge rectifier in the arrangement of FIG. 6.

Figure 7:
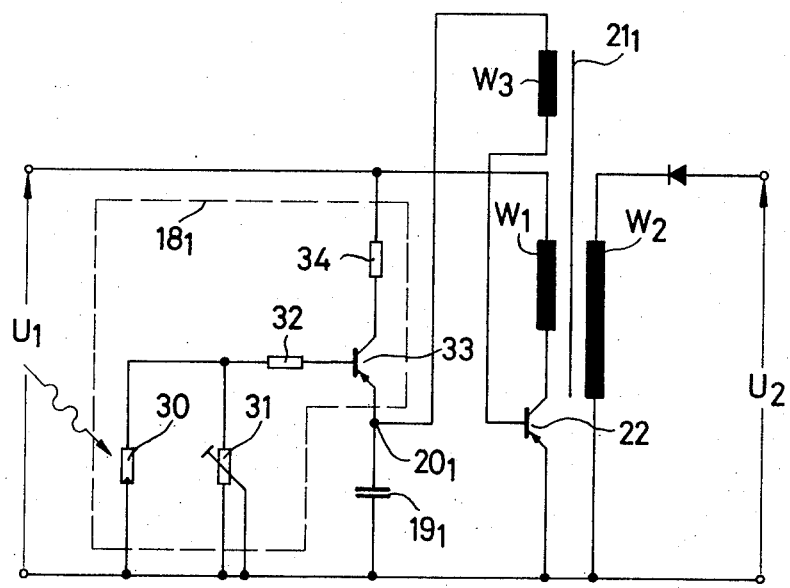

FIG. 7 shows a further direct current transformer arrangement which is in principle the same as that of FIG. 4. However, the simple photoconductive resistor $18_1$ in the FIG. 4 arrangement is replaced in the FIG. 7 arrangement by a constructional group which is shown enclosed by the dashed line $18_1$ and comprises elements 30, 31, 32, 33 and 34, element 30 comprising a photoelectric cell.

If light falls on the photoelectric cell 30, which has a relatively small area, a photoelectric voltage is formed which passes a control current via resistor 32 to the base of transistor 33. Depending on the size of the base current of this transistor 33, its emitter-collector path becomes more or less conductive thereby behaving in the manner of a resistor which is variable within wide limits. The constructional group 18, thus functions in the manner of a photoconductive resistance.

Resistor 34 enables the efficiency of the arrangement to be limited above a freely selectable illumination so that the output current of the apparatus can also be limited to freely selectable values. If such a limitation is neither necessary nor desired, resistor 34 becomes superfluous.

A trimmer resistor 31 is connected in parallel with the photoelectric cell 30 and serves to adjust the arrangement to optimum efficiency.

As to which of the embodiments according to FIGS. 4 to 7 is actually used in any individual case, depends on the space conditions for fitting the photoelectric cells 12 or for housing transformers $21_1$ to $21_3$. If a very limited amount of space is available, it is recommended to select a circuit according to FIG. 4. If the space and cost requirements are not as vital, it is recommended that a circuit according to FIG. 6 is used which provides a relatively larger power transmission.

The apparatus according to the invention is suitable for use in conjunction with electric lighters, clocks, measuring devices, and all units, both for household and industrial use, which hitherto have beeen powered from batteries.

I claim:

1. An apparatus for the conversion of light energy into electrical energy including a photoelectric transducer capable of generating electrical energy when exposed to visible or other light radiation, an electrical storage device connected to said photoelectric transducer for storing energy generated thereby, a direct current transformer connected to receive electrical energy derived from said photoelectric transducer and stored in said electrical storage device, said direct current transformer being adapted to convert the direct voltage output of said photoelectric transducer into an alternating or intermittent voltage, and a photosensitive device in circuit with said direct current transformer so as, in operation, to control the frequency of said alternating or intermittent voltage in dependence upon the level of illumination of said photoelectric transducer.

2. An apparatus as claimed in claim 1 further including a rectifier connected to the output of said direct current transformer for converting said alternating or intermittent voltage into a direct voltage, and a storage capacitor or accumulator cell connected to be charged by said rectified alternating or intermittent voltage.

3. An apparatus as claimed in claim 1 wherein said means for converting the direct voltage output of said photoelectric transducer into an alternating or intermittent voltage comprises an oscillator circuit having said photosensitive device connected to control the frequency of operation thereof.

4. An apparatus as claimed in claim 3 wherein said oscillator comprises a transistor having a primary winding in its collector-emitter circuit, and a feedback winding inductively coupled with said primary winding and connected in the transistor base circuit, and said photosensitive device is connected in an RC timing circuit coupled to the base of said transistor.

5. An apparatus as claimed in claim 4 wherein said oscillator is adapted for two phase operation and includes two such transistors operable in antiphase, each said transistor having associated therewith a said primary winding and a said feedback winding.

6. An apparatus as claimed in claim 1 wherein said means for converting the direct voltage output of said photoelectric transducer into an alternating or intermittent voltage comprises a switching circuit having said photosensitive device connected to control the frequency of switching thereof.

7. An apparatus as claimed in claim 6 wherein said switching circuit comprises a switching transistor having a primary winding in its collector-emitter circuit and having a trigger circuit, including said photosensitive device, coupled to the base thereof.

8. An apparatus as claimed in claim 7 wherein said trigger circuit includes an unijunction transistor having its emitter connected to a capacitor arranged to be charged at a rate determined by said photosensitive device and one of its bases connected to the base of said switching transistor.

9. An apparatus as claimed in claim 1 wherein said photosensitive device is selected to have the same spectral sensitivity as the photoelectric transducer.

10. An apparatus as claimed in claim 1 wherein the said photosensitive device is located in the same field of illumination as the photoelectric transducer.

11. An apparatus as claimed in claim 1 wherein said photosensitive device comprises a photoconductive device.

12. An apparatus as claimed in claim 1 wherein said photosensitive device comprises a photoelectric cell, and a transistor is coupled to said photoelectric cell to transform variations in the output voltage thereof into conductivity variations.

13. An apparatus as claimed in claim 1 including a neutral density filter in front of said photosensitive device.

14. An apparatus as claimed in claim 1 wherein said electrical storage device includes a capacitor connected in parallel with the photoelectric transducer.

15. An apparatus as claimed in claim 1 wherein said electrical storage device includes an inductor connected in series with the photoelectric transducer.

* * * * *